June 11, 1968  E. HINDIN ET AL  3,387,729
CONTAINER LIFTING FRAME FOR USE WITH FORKLIFT TRUCK
Filed July 25, 1966  3 Sheets-Sheet 1
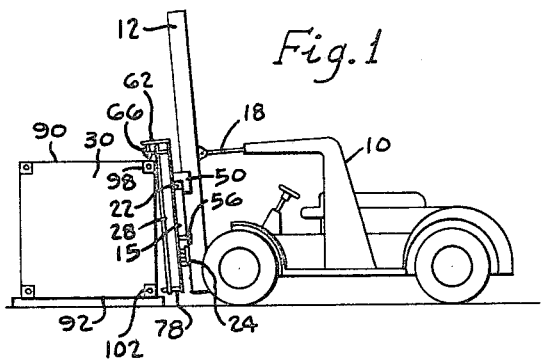
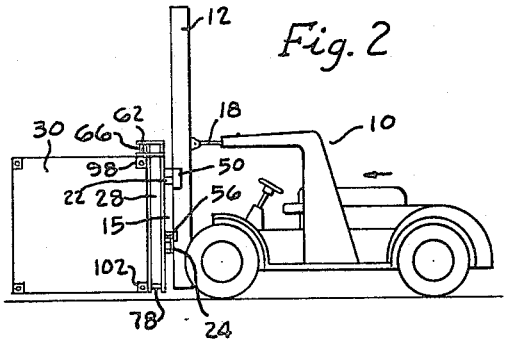
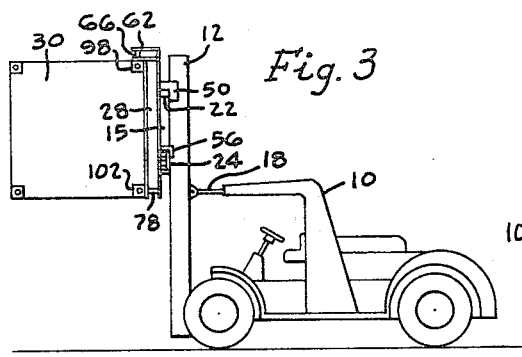
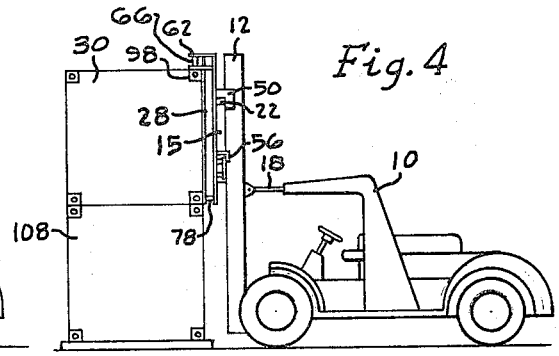
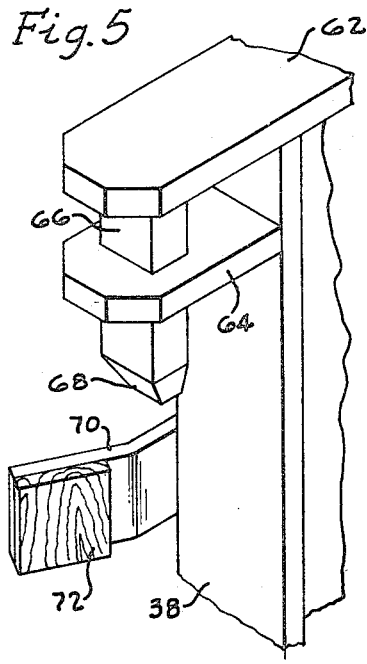
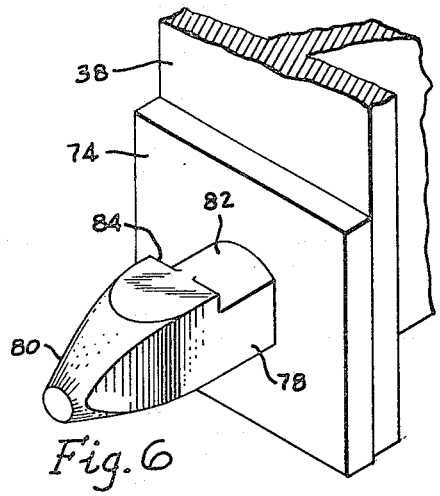
INVENTORS
EUGENE HINDIN
LOUIS A. KANDLE
SEMOND LEVITT
BY Millman and Jacobs
ATTORNEYS

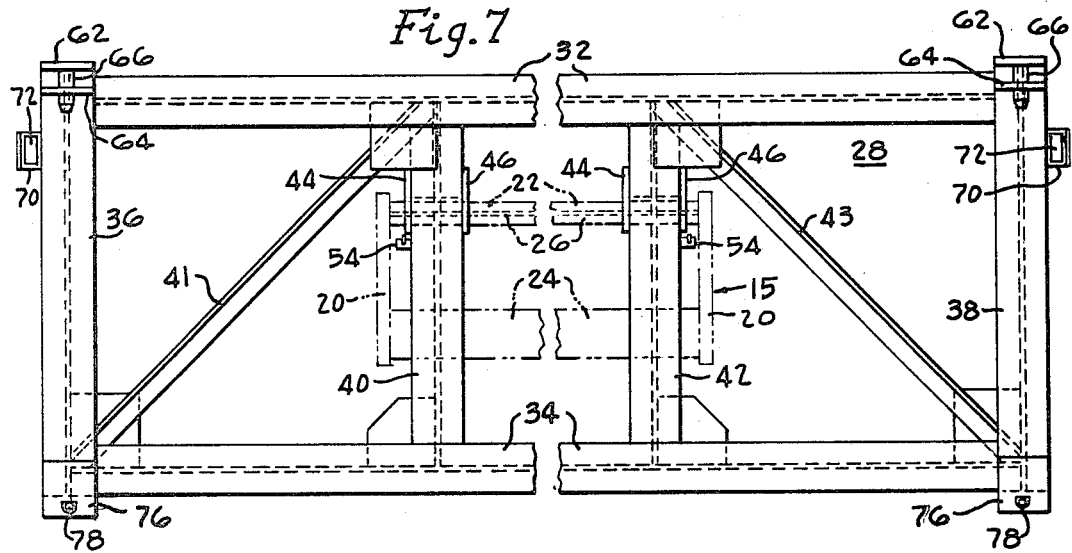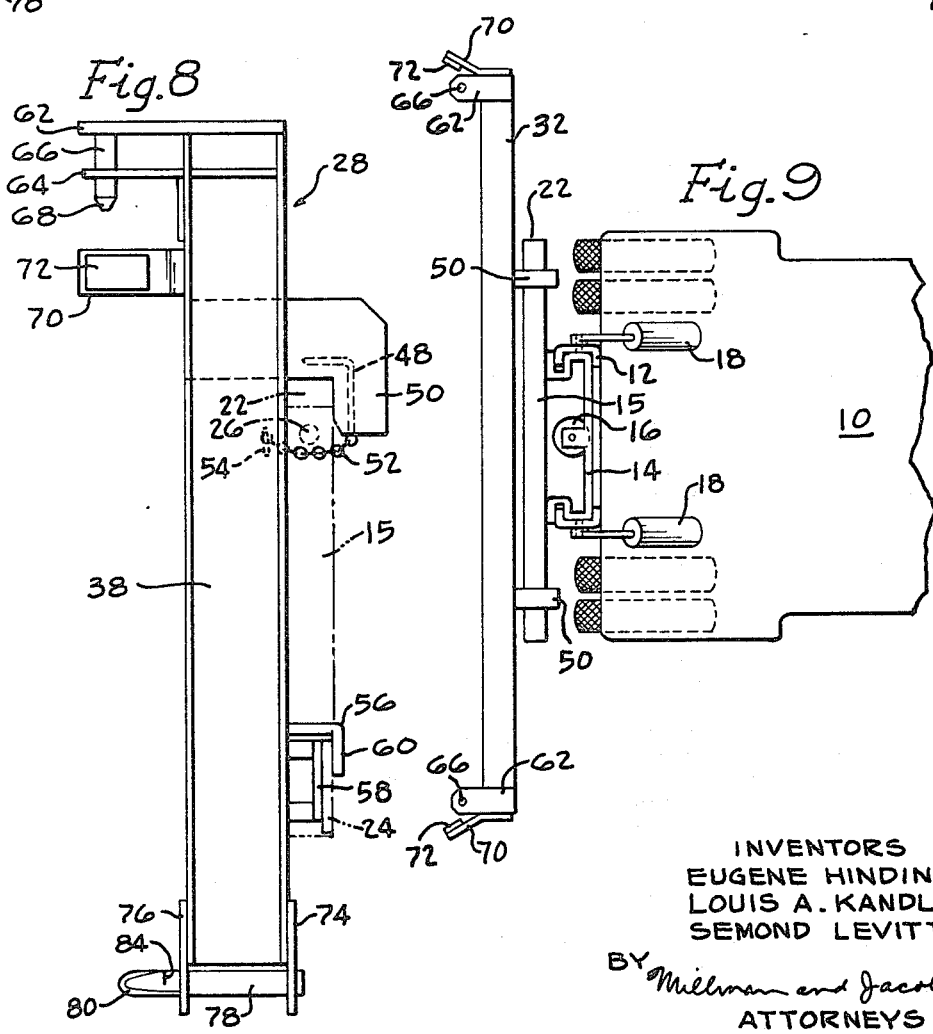

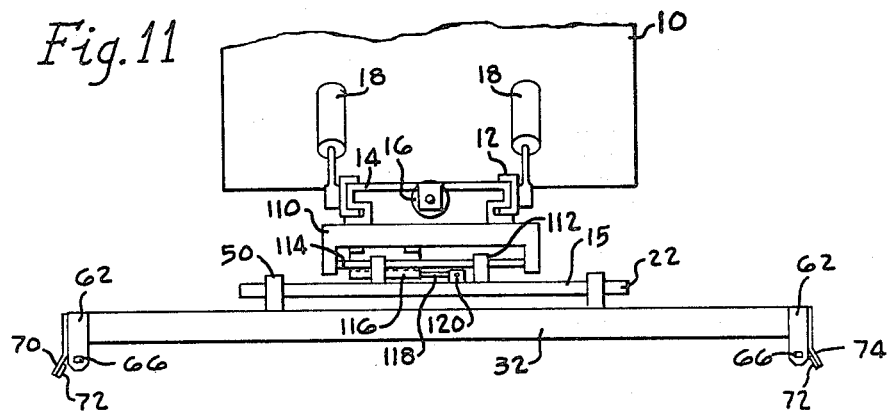
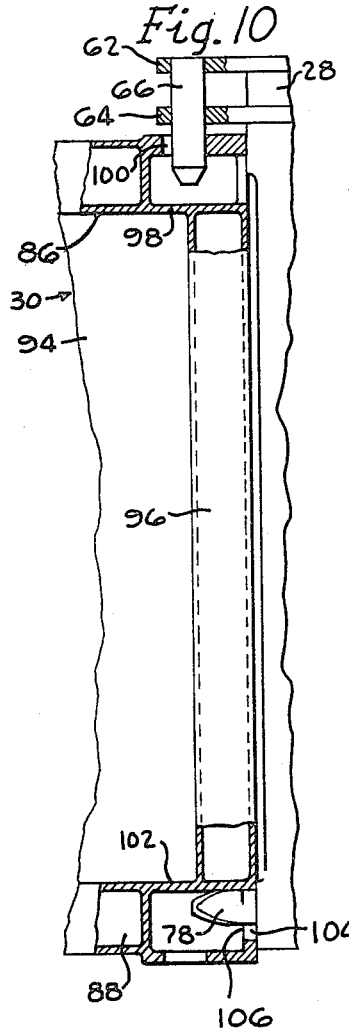
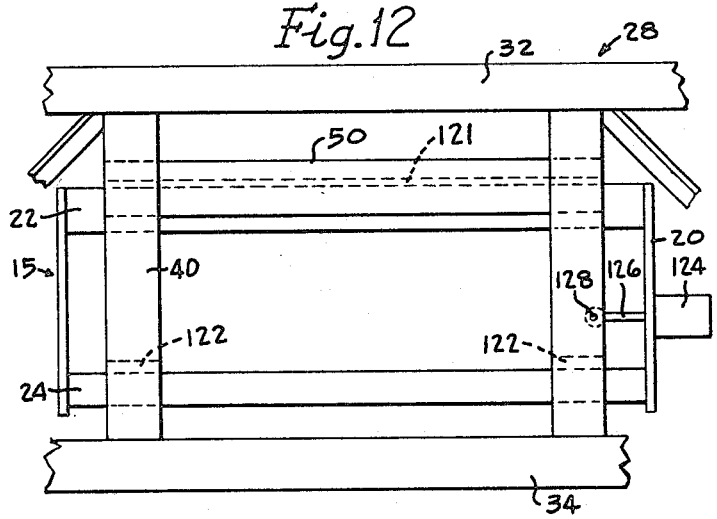
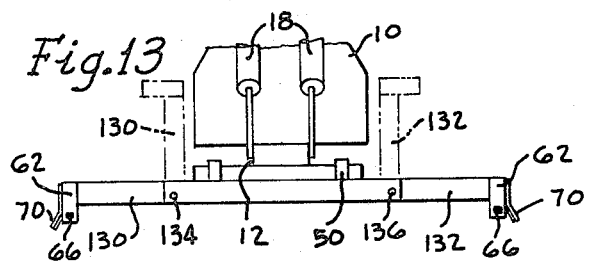
INVENTORS
EUGENE HINDIN
LOUIS A. KANDLE
SEMOND LEVITT
ATTORNEYS 3,387,729
CONTAINER LIFTING FRAME FOR USE WITH
FORKLIFT TRUCK
Eugene Hindin and Louis A. Kandle, Philadelphia, and
Semond Levitt, Huntingdon Valley, Pa., assignors to
Strick Corporation, Fairless Hills, Pa., a corporation of
Pennsylvania
Filed July 25, 1966, Ser. No. 567,699
10 Claims. (Cl. 214—621)

This invention relates to means for handling van size cargo containers.

The modern trend in freight haulage is known in the art as containerization and comprises the use of a van size cargo container, such as a trailer body, as the shipping container for intermodal transfer to highway, ship, rail or air transport, thus effecting savings in time and labor normally required for loading and unloading the cargo at intermodal transfers. A standard 20' trailer body fully laden with cargo carries about 44,800 pounds. Thus, the facilities, such as cranes and equivalent devices, for moving the laden containers in a loading area and for stacking them for storage or in preparation for shipment, as well as for effecting the intermodal transfers, are necessarily heavy, expensive and present difficulties in maneuverability.

The primary object of this invention is to provide a means for handling cargo van containers which can be mounted on fork lift trucks in place of the forks, thus obviating the need for heavy and expensive facilities, such as cranes and equivalent devices.

Another object of the invention is to provide a frame for attachment to a fork lift truck which is equipped with pin means adapted to readily enter the corner members of the cargo container, thus simplifying the lifting and stacking operation.

Another object of the invention is to provide a container lifting frame for attachment to a fork lift truck with gather means to effect alignment of the openings in the container corner members with the pins carried by the frame to permit ready engagement of the pins in the corner members.

Another object of the invention is to provide a container lifting frame for attachment to a fork lift truck with means to shift the frame laterally of the truck to permit the center of effort of the truck to be more closely aligned with the center of gravity of an unbalanced load in the container and/or to more quickly position the lifting frame on the container.

Yet another object of the invention is to provide a container lifting frame for attachment to a fork lift truck in which the side members of the frame may be pivoted for movement to positions along the sides of the truck to conserve space.

These and other objects of the invention will become more apparent as the following description proceeds in conjunction with the accompanying drawings, wherein:

FIGS. 1–4 are diagrammatic elevational views showing the sequence of steps using the instant invention for the lifting and stacking of van size cargo containers;

FIG. 5 is a fragmentary perspective view of one of the vertical pins carried by the lifting frame at its upper corners;

FIG. 6 is a fragmentary perspective view of one of the horizontal load-bearing pins carried by the lifting frame at its lower corners;

FIG. 7 is a front elevational view of the lifting frame per se with the movable fork lift truck frame to which it is attached being shown in phantom;

FIG. 8 is an end elevational view of the lifting frame shown in FIG. 7;

FIG. 9 is a top plan view, partly diagrammatic, of the lifting frame shown attached to a fork lift truck;

FIG. 10 is a fragmentary vertical sectional view showing the engagement of the vertical and horizontal pins of the lifting frame in engagement with the corner members of the container;

FIG. 11 is a top view, partly diagrammatic, of the invention in combination with a means to shift the lifting frame laterally;

FIG. 12 is a fragmentary top plan view of a modified form of the means to effect lateral shifting of the lifting frame; and FIG. 13 is a top plan view, partly diagrammatic, of yet another modified form of the lifting frame employing pivoted sections.

Specific reference is now made to the drawings in which similar reference characters are used for corresponding elements throughout.

Indicated generally at 10 is a conventional heavy duty fork lift truck, such for example as the Hyster Challenger 400 made by the Hyster Company of Danville, Ill. At its front end the truck mounts a vertically extending boom or upright 12 preferably in the form of interconnected vertical channels in which is movably mounted a load carriage 14 which mounts a subframe 15 that normally carries forks or load arms (not shown). A hydraulic means shown diagrammatically at 16 operatively acts upon the carriage 14 to raise and lower the same while another hydraulic means shown diagrammatically at 18 acts to tilt the upper end of the boom 12 about a vertical axis perpendicular to the ground. The sub-frame 15 is generally rectangular and includes spaced vertical side members 20 which are interconnected by spaced horizontal upper and lower bars 22 and 24, there being a rod 26 below the upper bar for mounting the forks.

The instant invention comprises a frame 28 preferably as long and as high as the container 30 which it is designed to lift. The frame is intended to lift a van size container about 20' long, about 8' high and about 8' wide, which when laden with cargo can attain a gross weight of about 44,800 lbs. The frame includes upper and lower horizontal members 32 and 34 which are interconnected at their ends by vertical members 36 and 38 and intermediate their ends by further substantially parallel members 40 and 42. Diagonal braces 41 and 43 interconnect the upper ends of the intermediate vertical members 40 and 42 with the lower ends of the end vertical members 36 and 38. Assuming the frame is designed to lift a 20' container, the distance between the end vertical members 36 and 38 will be about 20', between the intermediate vertical members 40 and 42 will be about 9' (which may vary depending on the fork lift truck used), and between the upper and lower horizontal members about 8'.

Secured to each intermediate member 40 and 42 below and adjacent the upper member 32 is a pair of rearwardly extending plates 44 and 46 joined by a connecting web 48, the plates thus forming a downwardly opening hook member 50 adapted to be positioned over and embrace the upper bar 22 of the sub-frame 15 of the movable carriage 14 of the lift truck after the forks have been removed. To limit upward relative movement between the lifting frame 28 and the sub-frame 15, the web 48 carries a chain 52 which passes beneath the rod 26 of the sub-frame and is removably received in a slotted lug 54 on each member 40 and 42 adjacent the hook member 50.

Secured to each member 40 and 42 above the lower member 34 is a rearwardly extending L-shaped bar 56 forming a downwardly opening hook. A further bar 58 is secured to the L-shaped bar 56 and is spaced from the lip 60 thereof so that the lower member 24 of the sub-frame 15 of the lift truck will be removably received in the space between the bar 58 and lip 60, as seen in FIG. 8. Thus, the lower end of the lifting frame is restrained against movement inwardly and outwardly of the lift truck.

Secured to the top of each end vertical member 36 and 38 is a pair of vertically spaced forwardly extending plates 62 and 64 which in turn secure a vertically extending pin 66 preferably of substantially rectangular cross-section and including a tapered tip 68. Below each pin 66, each vertical member 36 and 38 mounts a gathering or container guide means in the form of a bar or finger 70 which angles outwardly at approximately 30° and mounts an anti-scuff wooden block 72.

Secured to the lower end of each vertical member 36 and 38 below the lower horizontal member 34 is a pair of plates 74 and 76 which in turn secure a horizontal pin 78. The pin is generally rectangular in cross-section for the major portion of its length and includes a smoothly tapered tip 80. The contour of the pin is such that the upper surface of its rear portion 82 is reduced somewhat so that it contains a shoulder 84 just to the rear of the tapered tip 80.

The container 30 which is generally rectangular and enclosed, preferably comprises top and bottom rails 86 and 88 mounting a roof 90 and a floor member 92 and side walls 94 desirably of stressed skin construction, and hollow corner posts 96. At its top, each corner post secures a hollow corner member 98, which is also secured to the top rail 86, which corner member or casting includes a horizontal wall with an opening 100 therethrough which approximates the cross-sectional shape but is somewhat larger in area than that of the upper vertical pin 66. At its lower end, each corner post secures a hollow corner member or casting 102 which is also secured to the bottom rail 88, which corner member includes a vertical wall with an opening 104 therethrough which approximates the cross-sectional shape but is somewhat larger in area than that of the lower horizontal pin 78, see FIG. 10.

In use, the frame 28 is mounted on the sub-frame 15 by hooking the members 50 and 56 over the upper and lower horizontal members 22 and 24 of the sub-frame and then securing the chain 52 in place. The means 18 is then operated to tilt the upper end of the boom 12 away from the lift truck 10 until the upper vertical pins 66 are aligned with the openings 100 in the upper corner members 98. In most instances, the operator can effect the alignment quite readily. However, if he cannot, then the gathering fingers 70 by engaging the ends of the container will cause the frame 28 to shift laterally via the hook members 50 and 56 on the sub-frame 15 until proper alignment is obtained. The frame 28 is then lowered until the upper vertical pins extend into the upper corner members, as seen in FIG. 1. The boom 12 is then tilted back while the truck is moved toward the container, in which operation the lower horizontal pins enter the lower corner members and the action is continued until the container bears against the frame 28, as seen in FIGS. 2 and 10. By operation of the means 16, the container is then raised and carried in such condition by the lift truck to a desired location, as seen in FIG. 3. In this position, an edge 106 of the vertical wall of the lower corner member 102 engages behind the shoulder 84 of the pin 78 to prevent accidental retraction of the pin. If the container is to be stacked on a lower container 108, the container 30 is lowered thereon, the boom 12 is again tilted forwardly until the lower pins 78 are retracted horizontally from the lower corner members, the frame 28 is raised until the upper pins 66 are retracted vertically from the upper corner members, and the truck backed away for reuse elsewhere.

It will thus be seen that the top pins 66 take horizontal shear while the bottom pins 78 take the vertical load. The frame is such that the portion bounded by the lower horizontal member 34, the diagonal braces 41 and 43, that portion of the upper horizontal member 32 between the upper ends of the diagonal braces, and the vertical members 40 and 42 constitute a prime truss and the top member 32 acts as a beam-tie (tension) while the bottom member 34 which is heavier acts as a beam column.

At times, the load in the container is unbalanced so that the truck would tend to tilt if the container is lifted directly by the frame or rig 28 in this condition. To offset this, a means may be provided to align the center of gravity of the container with respect to the center of effort of the truck by causing the frame to shift laterally relative to truck. Also, if the truck is brought to the container off-center, it is quicker and more convenient to shift the lifting frame laterally than to reposition the truck.

One such means is shown in FIG. 11. There an additional frame 110 is provided which is secured to the carriage 14. The sub-frame 15 is mounted by suitable hook members 112 upon a cross-member 114 of the frame 110. A hydraulic cylinder 116 is mounted on the frame 110 and has an operative rod 118 which is connected as at 120 to the sub-frame 15. Thus, operation of the means 116, 118 will cause the sub-frame 15 to shift laterally (as well as the lifting frame 28 mounted thereon) relative to the center of effort of the lift truck.

Another such means is shown in FIG. 12. There the hook member 50 may be made to extend from vertical member 40 to vertical member 42 and can be provided with an anti-friction material 121 at the interface between the hook member 50 and the upper member 22 of the sub-frame 15, such as rollers or Teflon; whereas similar anti-friction material 122 is provided at the interfaces of the lower hook members 56 and the lower member 24 of the sub-frame 15. A hydraulic cylinder 124 is mounted on the sub-frame 15 whose rod 126 is pivotally connected as at 128 to one portion of the lifting frame 28. Thus, by operating the means 124, 126 the lifting frame 28 itself can be shifted laterally relative to the sub-frame 15.

To allow for better maneuverability in tight places, end sections 130 and 132 of the upper and lower members 32 and 34 of the lifting frame may be hinged around vertical pins 134 and 136 to the remaining portions of said members, so that these end sections 130 and 132 can be moved to positions rearwardly along the sides of the lift truck, as shown in dotted lines in FIG. 13.

While preferred embodiments of the invention have here been shown and described, skilled artisans may make minor variations without departing from the spirit of the invention and the scope of the appended claims.

We claim:

1. In combination with a substantially rectangular container having upper and lower corner members, the upper corner members each including a horizontal wall with an opening therethrough, the lower corner members each including a vertical wall with an opening therethrough and a lift truck including a vertical boom, a sub-frame mounted thereon and means to move said sub-frame vertically along said boom; means to lift said container comprising a substantially rectangular frame substantially as long and as high as said container, means to mount said frame on said sub-frame, lower horizontal pins carried by said frame adjacent its lower corners and adapted to enter said lower container corner members via said openings through their vertical walls, and upper vertical pins carried by said frame adjacent its upper corners and adapted to enter said upper container corner members via said openings through their horizontal walls.

2. The combination of claim 1 wherein said frame includes upper and lower horizontally extending members interconnected by vertically extending members and diagonal braces forming a truss, said upper horizontal member acting as a beam-tie, said lower horizontal member acting as a beam column.

3. The combination of claim 1 wherein said sub-frame includes spaced upper and lower horizontally extending members and said means to mount said frame on said sub-frame includes upper and lower downwardly opening hook members adapted to removably engage said upper and lower sub-frame members.

4. The combination of claim 3 and gathering means on said frame beneath said upper vertical pins adapted to engage the ends of said container and move said frame relative to said sub-frame to align said upper vertical pins with said openings in said upper corner members.

5. The combination of claim 1 and means to move said frame laterally relative to said truck.

6. The combination of claim 1 and means to move said frame laterally relative to said sub-frame.

7. The combination of claim 1 and means to tilt the upper end of said boom towards and away from said truck so that said upper horizontal pins can be positioned over said upper container corner members.

8. A method of lifting a container having corner members with openings through horizontal and vertical walls of the upper and lower members respectively comprised of providing a frame with upper vertical and lower horizontal pins, first inserting the upper vertical pins through the openings in the horizontal walls of the upper container corner members, then moving the lower horizontal pins through the openings in the vertical walls of the lower container corner members and then applying power to the frame to raise it and the container with the pins engaged in the container corner members.

9. The method of claim 8 and the steps of tilting the frame so that the upper vertical pins are positioned above the openings in the upper corner members prior to insertion of the upper vertical pins therein and then tilting the frame back to its original position to effect insertion of the lower horizontal pins into the openings in the lower corner members.

10. The method of claim 9 and the step of causing portions of the frame to engage the ends of the container and cause the frame to shift relative to the container to the position wherein the upper vertical pins are aligned with the openings in the upper corner members.

11. In combination with a container having upper and lower members, the upper members spaced on opposite sides of the center line of said container each including a horizontal wall with an opening therethrough, the lower members spaced on opposite sides of the center line of said container each including a vertical wall with an opening therethrough and a lift truck including a vertical boom, a sub-frame mounted thereon and means to move said sub-frame vertically along said boom; means to lift said container comprising a frame, means to mount said frame on said sub-frame, horizontal pins carried by said frame adjacent its lower end and adapted to enter said lower container members via said openings through their vertical walls, and vertical pins carried by said frame adjacent its upper end and adapted to enter said upper container members via said openings through their horizontal walls.

References Cited
UNITED STATES PATENTS

| | | | |
|---|---|---|---|
| 2,827,184 | 3/1958 | Mueller | 214—654 X |
| 2,828,880 | 4/1958 | Perry | 214—730 |
| 3,015,407 | 1/1962 | Fesmire et al. | 294—67 X |
| 3,094,226 | 6/1963 | Gutridge et al. | 214—654 X |

GERALD M. FORLENZA, *Primary Examiner.*

R. BALLANTYNE, *Assistant Examiner.*